United States Patent [19]

Hutchins et al.

[11] Patent Number: 5,203,834

[45] Date of Patent: Apr. 20, 1993

[54] FOAMED GELS HAVING SELECTIVE PERMEABILITY

[75] Inventors: Richard D. Hutchins, Placentia; Burton B. Sandiford, Balboa Island; Hoai T. Dovan, Yorba Linda, all of Calif.

[73] Assignee: Union Oil Company of California, Los Angeles, Calif.

[21] Appl. No.: 843,954

[22] Filed: Feb. 28, 1992

Related U.S. Application Data

[63] Continuation-in-part of Ser. No. 631,863, Dec. 21, 1990, Pat. No. 5,145,012.

[51] Int. Cl.$^5$ .................... E21B 33/138; E21B 43/22
[52] U.S. Cl. .................... 166/270; 166/273; 166/295; 166/300; 166/309
[58] Field of Search ........... 166/270, 273, 274, 292, 166/293, 294, 295, 300, 308, 309

[56] References Cited

U.S. PATENT DOCUMENTS

| | | | |
|---|---|---|---|
| 2,059,459 | 11/1936 | Hund et al. | |
| 2,434,605 | 1/1948 | Wrightsman | 166/294 |
| 3,301,723 | 1/1967 | Chrisp | 149/20 |
| 3,306,870 | 2/1967 | Eilers et al. | |
| 3,369,602 | 2/1968 | Fallgatter et al. | |
| 3,416,603 | 12/1968 | Bernard | 166/295 |
| 3,437,141 | 10/1968 | Brandner et al. | 166/273 |
| 3,482,636 | 12/1969 | Crowe | 166/307 |
| 3,613,790 | 10/1971 | Stout et al. | 166/294 |
| 3,687,200 | 8/1972 | Routson | 166/275 |
| 3,727,689 | 4/1973 | Clampitt | 166/283 |
| 3,740,360 | 6/1973 | Nimerick | 166/295 |
| 3,782,467 | 1/1974 | Hessert | 166/261 |
| 3,785,437 | 1/1974 | Clampitt et al. | 166/281 |
| 3,818,998 | 6/1974 | Hessert | 175/72 |
| 3,881,552 | 5/1975 | Hessert | 166/294 |
| 3,908,760 | 9/1975 | Clampitt et al. | 166/246 |
| 3,921,733 | 11/1975 | Clampitt | 175/65 |
| 3,926,258 | 12/1975 | Hessert et al. | 166/294 |
| 3,971,440 | 7/1976 | Hessert et al. | 166/270 |
| 3,978,928 | 9/1976 | Clampitt | 166/294 |
| 4,015,995 | 4/1977 | Hess | 166/295 X |
| 4,018,286 | 4/1977 | Gall et al. | 166/295 |
| 4,040,484 | 8/1977 | Hessert | 166/294 |
| 4,110,230 | 8/1978 | Hessert et al. | 252/8.551 |
| 4,157,116 | 6/1979 | Coulter | 166/280 |
| 4,178,993 | 12/1979 | Richardson et al. | 166/300 |
| 4,289,633 | 9/1981 | Richardson et al. | 252/8.552 |
| 4,290,485 | 9/1981 | Free et al. | 166/281 |
| 4,413,680 | 11/1983 | Sandiford et al. | 166/270 |
| 4,453,596 | 6/1984 | Conway et al. | 166/308 X |
| 4,460,751 | 7/1984 | Hanlon et al. | 525/371 |
| 4,464,270 | 8/1984 | Hollenbeck et al. | 252/8.551 |

(List continued on next page.)

OTHER PUBLICATIONS

Zaitoun et al., "Modification of Water/Oil and Water/Gas Relativer Permeabilities After Polymer Treatment of Oil or Gas Wells," paper presented at the 1987 Fourth Sur. Symp. on EOR, Hamburg, Oct. 27-29, Proceedings pp. 839-850.
Routson et al., Paper No. SPE 3992, (1972).
Needham et al., SPE 4747 (1974).
Bernard et al., Society of Petroleum Engineers Journal, (Sep. 1964), pp. 267-274.
Bernard et al., Society of Petroleum Engineers Journal, (Aug. 1980), pp. 281-292.
SPE 10774.
Zaitoun et al., SPE 18085, (1988).
Zaitoun et al., SPE 18501, (1989).
Avery et al., SPE 18201, (1988).
Bernard et al., Society of Petroleum Engineers Journal, (Dec. 1965), pp. 295-300.
Holm L. W., Society of Petroleum Engineers Journal, (Dec. 1968), pp. 359-369.
SPE 19689.
SPE/DOE 17362.

Primary Examiner—George A. Suchfield
Attorney, Agent, or Firm—Gregory F. Wirzbicki; Shlomo R. Frieman

[57] ABSTRACT

Pathway-containing foamed gels enhance the recovery of the nonaqueous fluids from subterranean formations by selectively reducing the flow of aqueous fluids with respect to the flow of nonaqueous fluids.

25 Claims, No Drawings

U.S. PATENT DOCUMENTS

| | | | |
|---|---|---|---|
| 4,470,915 | 9/1984 | Conway | 252/8.551 |
| 4,494,606 | 1/1985 | Sydansk | 166/295 |
| 4,498,539 | 2/1985 | Bruning | 166/294 |
| 4,502,967 | 3/1985 | Conway | 252/8.551 |
| 4,524,828 | 6/1985 | Sabins et al. | 166/293 |
| 4,534,412 | 8/1985 | Dovan et al. | 166/295 |
| 4,541,488 | 9/1985 | Gömöry et al. | 166/307 |
| 4,569,393 | 2/1986 | Bruning et al. | 166/270 |
| 4,572,295 | 2/1986 | Walley | 166/295 |
| 4,579,670 | 4/1986 | Payne | 252/8.551 |
| 4,643,255 | 2/1987 | Sandiford | 166/295 |
| 4,664,194 | 5/1987 | Marrocco | 166/295 |
| 4,665,986 | 5/1987 | Sandiford | 166/270 X |
| 4,678,032 | 7/1987 | Shu | 166/295 |
| 4,683,949 | 8/1987 | Sydansk et al. | 166/270 |
| 4,694,906 | 9/1987 | Hutchins et al. | 166/294 |
| 4,732,213 | 3/1988 | Bennett et al. | 166/292 |
| 4,776,398 | 10/1988 | Chu et al. | 166/274 |
| 4,779,680 | 10/1988 | Sydansk | 166/300 |
| 4,787,451 | 11/1988 | Mitchell | 166/270 |
| 4,796,700 | 1/1989 | Sandiford et al. | 166/270 |
| 4,809,781 | 3/1989 | Hoefner | 166/273 |
| 4,815,537 | 3/1989 | Jones | 166/270 |
| 4,821,802 | 4/1989 | Meltz et al. | 166/270 |
| 4,842,071 | 6/1989 | Zaitoun et al. | 166/295 |
| 4,844,163 | 7/1989 | Hazlett et al. | 166/270 |
| 4,896,723 | 1/1990 | Hoskin et al. | 166/272 |
| 4,899,818 | 2/1990 | Jennings et al. | 166/270 |
| 4,901,795 | 2/1990 | Phelps | 166/270 |
| 4,901,797 | 2/1990 | Summers et al. | 166/292 |
| 4,903,767 | 2/1990 | Shu et al. | 166/270 |
| 4,928,763 | 5/1990 | Falk | 166/300 X |
| 4,941,533 | 7/1990 | Buller et al. | 166/270 |
| 5,010,954 | 4/1991 | Falk | 166/295 |
| 5,067,564 | 11/1991 | Sydansk | 166/270 |
| 5,069,283 | 12/1991 | Mack | 166/309 X |
| 5,105,884 | 4/1992 | Sydansk | 166/270 |
| 5,145,012 | 9/1992 | Hutchins et al. | 166/292 |

FOAMED GELS HAVING SELECTIVE PERMEABILITY

CROSS REFERENCE TO RELATED APPLICATIONS

This application is a continuation-in-part of U.S. application Ser. No. 07/631,863, now U.S. Pat. No. 5,145,012, filed Dec. 21, 1990, which is incorporated herein in its entirety by this reference.

BACKGROUND

The present invention relates to (a) methods for selectively reducing subterranean water permeability, (b) subterranean formations containing compositions for selectively reducing subterranean water permeability, (c) enhanced oil recovery techniques, and (d) foamed gels having selective permeability to hydrocarbon fluids.

During the life cycle of a hydrocarbon producing well, e.g., a well for extracting oil or natural gas from the earth, the producing well commonly also yields water. In these instances, the amount of water produced from the well tends to increase over time, with a concomitant reduction in hydrocarbon production. Frequently, the production of water becomes so profuse that remedial measures have to be taken to decrease the water/hydrocarbon production ratio or, as a last resort, the well is closed in because it has completely stopped producing hydrocarbons or the production of hydrocarbons has become uneconomical.

Some of the remedial measures used to enhance the recovery of hydrocarbons from these wells entail injecting polymers into portions of the subterranean formation to plug off water producing zones within the formation. Unfortunately, not all of these remedial measures are successful and, in some cases, the injected polymer actually further impairs the recovery of hydrocarbons from the treated well. Even in cases where the polymer treatment does initially reduce the water/hydrocarbon production ratio, very commonly this ratio generally increases over time until the well again requires a remedial treatment.

In addition, many enhanced oil recovery projects (e.g., miscible floods (such as carbon dioxide and hydrocarbon (e.g., propane, butane, and pentane enhanced natural gas) miscible floods), steam floods, fire floods (also known as in situ combustion), and immiscible floods (such as nitrogen, flue gas, and carbon dioxide immiscible floods)) inject a gas through an injection well in an attempt to increase the recovery of oil from producing wells. Because gases tend to override and/or flow through the most gas-permeable zones of the subterranean formation, various formation zones remain virtually untouched by the injected gas. Although attempts have been made to employ polymers in a few of these enhanced oil recovery techniques to divert the injected fluid to other parts of the subterranean formation, these injected polymers, while being effective for blocking the flow of fluids through the more permeable portion of the formation, also substantially prevent the passage of any gas or liquid through the blocked zones. Accordingly, the use of polymers to block the more permeable zones of a subterranean formation makes it very difficult or virtually impossible for the enhanced oil recovery technique to recover any additional residual oil remaining in the blocked zones of the formation.

SUMMARY OF THE INVENTION

The present invention provides a method for selectively reducing the flow of an aqueous fluid (e.g., water) with respect to the flow of a nonaqueous fluid (e.g., oil, natural gas) in a subterranean formation. In accordance with this version of the invention, (i) a composition capable of forming a foamed gel and (ii) a gas are injected into at least a portion of the subterranean formation. The composition comprises (a) an ingredient capable of transforming the composition into a gel, (b) a surfactant, and (c) a delayed gel degrading agent. The composition and gas interact, forming the foamed gel. The delayed gel degrading agent creates pathways in the foamed gel. At least some of the pathways link bubbles present in the gel. The presence of the pathways enhances the flow of hydrocarbons, especially gaseous hydrocarbons, in preference to water through the foamed gel. Accordingly, the treated well typically has a substantially reduced water/hydrocarbon production ratio.

The present invention also provides a recovery system comprising (a) a subterranean formation, (b) a well penetrating at least a portion of the subterranean formation, and (c) a foamed gel, permeable to a nonaqueous fluid, in at least a portion of the subterranean formation.

In addition, the invention encompasses a foamed gel having pathways therein. As noted above, some of the pathways link bubbles present in the gel.

In another version of the present invention, the vertical fluid permeability profile of a subterranean formation is conformed. The vertical conformation procedure of the invention entails injecting (i) a gas and (ii) a foamable, gelable composition through an injection well and into the formation. The interaction of the gas and composition creates a foamed gel that selectively permits the passage of a nonaqueous fluid while inhibiting the passage of aqueous liquids.

When employed in conjunction with an enchanced oil recovery procedure, the above vertical conformation technique is performed prior to or during the performance of the enhanced oil recovery procedure. Accordingly, the fluid (e.g., carbon dioxide, steam, organic vapor) injected during a subsequent enhanced oil recovery procedure tends (a) to be distributed by the nonaqueous fluid-permeable foamed gel more uniformly along the vertical profile of the subterranean formation and (b), after passing through the foamed gel, to more uniformly sweep through the formation.

The selective reduction in the rate of water permeability with respect to the rate of nonaqueous fluid permeability through a subterranean formation containing the foamed gel of the present invention is quite surprising in view of the prior art use of foams, in general, and foamed gels, in particular, to block or divert subterranean fluid movement.

DETAILED DESCRIPTION OF THE INVENTION

A. Selective Reduction of Water/Hydrocarbon Production Ratio

One aspect of the present invention entails selectively reducing the flow of an aqueous fluid with respect to the flow of a nonaqueous fluid in a subterranean formation. Exemplary aqueous fluids include ground water, reservoir connate water, brine, and aqueous-based fluids injected as part of various enhanced oil and gas recovery techniques. The nonaqueous fluids include, but are not necessarily limited to, liquid hydrocarbons (e.g., oil), gaseous hydrocarbons (e.g., natural gas), carbon dioxide, helium, hydrogen, and hydrogen sulfide.

In the selective reduction method of the invention, a gas and a composition comprising (a) an ingredient capable of transforming the composition into a gel, (b) a surfactant capable of foaming the composition, and (c) a delayed gel degrading agent are injected into at least a portion of a subterranean formation through a production well. The injected gas interacts with the composition to form a foamed composition. After a period of time, the foamed composition gels and the delayed gel degrading agent creates pathways in the foamed gel. At least some of the pathways connect bubbles present in the gel.

As used in the specification and claims the term "gel" means a substance selected from the group consisting of (a) colloids in which the dispersed phase has combined with the continuous phase to produce a viscous, jelly-like product, (b) crosslinked polymers, and (c) mixtures thereof. Many gel-forming ingredients have been used by those skilled in the art to treat subterranean formations. For example, ingredients which form colloidal gels are noted in U.S. Pat. No. 3,687,200 and U.S. Pat. No. 4,732,213, these patents being incorporated herein in their entirety by reference. Silicates, colloidal silicas, as well as their ammonium and alkali metal salts, are the more common colloidal gel-forming ingredients.

Exemplary crosslinked polymer forming ingredients are discussed in U.S. Pat. No. 3,306,870, U.S. Pat. No. 3,727,687, U.S. Pat. No. 3,740,360, U.S. Pat. No. 3,749,172, U.S. Pat. No. 3,749,174, U.S. Pat. No. 3,782,467, U.S. Pat. No. 3,785,437, U.S. Pat. No. 3,818,998, U.S. Pat. No. 3,881,552, U.S. Pat. No. 3,897,827, U.S. Pat. No. 3,908,760, U.S. Pat. No. 3,921,733, U.S. Pat. No. 3,926,258, U.S. Pat. No. 3,971,440, U.S. Pat. No. 3,978,928, U.S. Pat. No. 4,018,286, U.S. Pat. No. 4,040,484, U.S. Pat. No. 4,074,757, U.S. Pat. No. 4,110,230, U.S. Pat. No. 4,290,485, U.S. Pat. No. 4,413,680, U.S. Pat. No. 4,460,751, U.S. Pat. No. 4,464,270, U.S. Pat. No. 4,470,915, U.S. Pat. No. 4,494,606, U.S. Pat. No. 4,498,539, U.S. Pat. No. 4,502,967, U.S. Pat. No. 4,534,412, U.S. Pat. No. 4,572,295, U.S. Pat. No. 4,579,670, U.S. Pat. No. 4,643,255, U.S. Pat. No. 4,664,194, U.S. Pat. No. 4,667,032, U.S. Pat. No. 4,683,949, U.S. Pat. No. 4,694,906, U.S. Pat. No. 4,776,398, U.S. Pat. No. 4,779,680, U.S. Pat. No. 4,787,451, U.S. Pat. No. 4,796,700, U.S. Pat. No. 4,821,802, U.S. Pat. No. 4,896,723, SPE 18201, and SPE 3992, these documents being incorporated herein in their entirety by reference.

A crosslinked polymer is generally formed by reacting or contacting proper proportions of a crosslinkable polymer with a crosslinking agent. However, the gel-forming composition need only contain either the crosslinkable polymer or the crosslinking agent. When the crosslinkable polymer or crosslinking agent is omitted from the composition, the omitted material is usually introduced into the subterranean formation as a separate slug, either before, after, or simultaneously with the introduction of the gel-forming composition. Preferably, the composition comprises at least the crosslinkable polymer or monomers capable of polymerizing to form a crosslinkable polymer (e.g., acrylamide, vinyl acetate, acrylic acid, vinyl alcohol, methacrylamide, ethylene oxide, propylene oxide, and vinyl pyrrolidone). More preferably, the composition comprises both (a) the crosslinking agent and (b) either (i) the crosslinkable polymer or (ii) the polymerizable monomers capable of forming a crosslinkable polymer.

Typically, the crosslinkable polymer is water soluble. Common classes of water soluble crosslinkable polymers include polyvinyl polymers, polymethacrylamides, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl pyrrolidone, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred water soluble crosslinkable polymers include hydroxypropyl guar, partially hydrolyzed polyacrylamides, xanthan gum, polyvinyl alcohol, and the ammonium and alkali metal salts thereof.

The crosslinkable polymer is available in several forms such as a water solution or broth, a gel log solution, a dried powder, and a hydrocarbon emulsion or dispersion. As is well known to those skilled in the art, different types of equipment are employed to handle these different forms of crosslinkable polymers.

With respect to the crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, resorcinol, glutaraldehyde, catechol, hydroquinone, gallic acid, pyrogallol, phloroglucinol, formaldehyde, and divinylether are some of the more typical organic crosslinking agents. Typical inorganic crosslinking agents are polyvalent metals, chelated polyvalent metals, and compounds capable of yielding polyvalent metals. Some of the more common inorganic crosslinking agents include chromium salts, aluminates, gallates, dichromates, titanium chelates, aluminum citrate, chromium citrate, chromium acetate, and chromium propionate.

Preferred surfactants for use in the practice of the invention are water-soluble and have sufficient foaming ability to enable the composition, when traversed by a gas, to foam and, upon curing, form a foamed gel. Non-limiting examples of the preferred surfactants are those which, when incorporated into water in a concentration of about 5 weight percent or less (based on the total weight of water and surfactant), meet the following described test. The surfactant is dissolved in water and about 500 ml of the resulting solution is placed in a graduated cylinder to form a column having a height of about 50 cm. Natural gas is passed into the bottom of the column through a fritted glass disc at substantially atmospheric pressure so that the gas bubbles through the column of liquid and passes out the top of the cylinder. The gas rate is maintained at about 500 ml gas per minute per square inch of column cross-sectional area, and the flow of the gas is continued for a period of about 15 minutes. The preferred surfactants produce a column of foam at least about 180 cm in height under these conditions at the top of the column of water.

Typically, the surfactant is used in a concentration of up to about 10, preferably about 0.01 to about 5, more preferably about 0.05 to about 3, and most preferably about 0.1 to about 2 weight percent. Unless otherwise indicated, as used in the specification and claims, the term "weight percent" means the weight of a particular ingredient (e.g., surfactant, crosslinking agent, polymer, and delayed gel degrading agent) divided by the total weight of all ingredients present in the foamable, gelable composition.

Exemplary surfactants include, but are not limited to, alkyl polyethylene oxide sulfates (e.g., Alipal CD 128 brand surfactant), alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl guanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$ to $C_6$ sulfodicarboxylic acids having the general formula

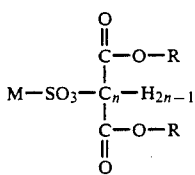

where M is selected from the group consisting of alkali metals, ammonium, and substituted ammonium; R is an alkyl group containing about 3 to about 16 carbon atoms, and n is an integer from 1 to about 4.

Delayed gel degrading agents include, but are not limited to, (a) delayed acting pH modifying agents, (b) gas precursors, and (c) crosslinking agents in sufficient concentrations to cause syneresis. Individual delayed gel degrading agents or combinations of delayed gel degrading agents are employed in the present invention.

Exemplary delayed acting pH modifying agents are acid precursors and base precursors which generally either hydrolyze or thermally decompose to form an acid or a base, respectively. Typical classes of acid precursors include hydrolyzable esters, acid anhydrides, sulfonates, organic halides, and salts of a strong acid and a weak base. Exemplary specific acid precursors are ethyl formate, propyl formate, ethyl acetate, glycerol monoacetate, acetin, glycerol diacetate, diacetin, xanthanes, thiocyanates, polyethylene esters, ethyl acetate esters, acrylate copolymers, and dimethyl esters. Ethyl formate, propyl formate, ethyl acetate, dibasic esters, and their mixtures are the preferred acid precursors. The more widely known base precursor classes are ammonium salts, quaternary ammonium salts, urea, substituted ureas, coordinated compounds, and salts of a strong base and a weak acid, with the preferred base precursors being urea, thiourea, ammonium chloride, and mixtures thereof.

The concentration of the delayed acting pH modifying agents in the gel-forming composition is less than the concentration required to virtually degrade the entire gel. Preferably, the delayed acting pH modifying agent concentration in the composition is sufficient to change the pH of the composition by at least about 2 units, more preferably at least about 3 units, and most preferably at least about 4 units. Based upon the total weight of the foamed gel-forming composition, the delayed pH modifying agent is usually present in a concentration of about 0.2 to about 20 weight percent. Preferably, the concentration of the delayed acting pH modifying agent is about 0.3 to about 15, more preferably about 0.4 to about 10, and most preferably about 0.5 to about 5 weight percent.

Crosslinking agents, when present in the composition in excess, also act as delayed gel degrading agents—partially degrading the foamed gel by syneresis. A concentration of at least about twice the optimal crosslinking concentration is generally sufficient to cause syneresis. To act as a delayed gel degrading agent, the crosslinking agent is usually present in the composition in a concentration of at least about 1.5, preferably about 1.5 to about 15, more preferably about 2 to about 10, and most preferably about 3 to about 8 weight percent based upon all the ingredients comprising the composition.

The gas precursors generally fall into two categories, namely, (a) materials capable of decomposing into a gas at a temperature less than about 300° C. and (b) materials capable of decomposing into a gas at a pH of about 3 to about 11. Some gas precursors fall into both categories. With respect to temperature-activated gas precursors, these gas precursors preferably decompose into a gas at a temperature less than about 200° C., and more preferably at a temperature less than about 150° C.

Typical gas precursors include, but are not necessarily limited to, ammonium and alkali metal salts of bicarbonates, bisulfates, carbonates, sulfides, bisulfides, and sulfites; thioacetamide; urea; substituted ureas; and mixtures thereof. Preferably, the gas precursor is selected from the group consisting of ammonium bicarbonate, ammonium bisulfite, ammonium sulfite, potassium bicarbonate, potassium bisulfite, potassium sulfite, potassium sulfide, potassium bisulfide, sodium bicarbonate, sodium bisulfite, sodium sulfide, sodium bisulfide, thioacetamide, urea, thiourea, and mixtures thereof. Ammonium bicarbonate, potassium bicarbonate, sodium bicarbonate, and mixtures thereof are the more preferred gas precursors. However, to avoid damaging formation permeability, it is very desirable to employ the ammonium and potassium salts when treating formations containing water reactive clays.

In general, the foamable gel-forming composition comprises a sufficient concentration of the gas precursor to form connecting pathways between bubbles in the foamed gel upon decomposition of the gas precursor. The concentration of gas precursor necessary to achieve the above results depends upon the temperature and pressure of the subterranean formation in which the composition is injected. Ordinarily, a subterranean formation treated in accordance with the invention has a temperature of at least about 15° C. and a pressure greater than about 1 atm. More typically, the formation temperature is about 15° to about 275° C. and very commonly about 50° to about 150° C. The formation pressure frequently tends to be about 3 to about 700 atm and is even more often about 5 to about 200 atm.

Usually, the gas precursor concentration necessary to form the connecting pathways decreases with increasing formation temperature, but increases with increasing formation pressure. As a result of the temperature and pressure conditions in the formation, the foamable, gel-forming composition frequently comprises about 0.01 to about 10, preferably about 0.05 to about 5, and more preferably about 0.5 to about 2, weight percent gas precursor based upon the total weight of the foamable, gel-forming composition. The concentration of the gas precursor is commonly greater than about 1, even greater than about 1.5, as well as greater than about 2, and indeed greater than about 3, weight percent based upon the total weight of the gel-forming composition.

Because there are different types of gas precursors, there are also different techniques for converting the gas precursor into the gas. One conversion technique entails employing a temperature-activated gas precursor that simply decomposes into a gas at the temperature of the subterranean formation being treated. Another gas precursor conversion technique requires the use of the delayed acting pH modifying agents which are subsequently modified to form an active material that transforms at least some, and preferably substantially all, of the gas precursor into the gas.

When used in conjunction with a gas precursor, the concentration of the delayed acting pH modifying agent in the foamable, gel-forming composition is preferably sufficient to transform some, and more preferably substantially all, of the gas precursor into the gas. For example, the concentration of the delayed acting pH modifying agent in the composition is preferably sufficient to change the pH of the composition by at least about 0.5 units. In some cases it is further preferred that the delayed acting pH modifying agent concentration be sufficient to change the pH of the composition by one or more pH units. Based upon the total weight of the foamable, gel-forming composition, the delayed pH modifying agent is usually present in a concentration of about 0.05 to about 5, preferably 0.2 to about 2, and more preferably about 0.5 to about 1.5, weight percent.

One or more slugs of a gas are also injected into the subterranean formation. While the gas slugs are injectable before, during, or after the injection of the foamed gel-forming composition, it is preferred to inject at least some, and more preferentially all, of these slugs after or simultaneously during the injection of the composition. Also preferred is the alternate, sequential injection of one or more slugs of the foamable, gel-forming composition and one or more slugs of the gas. The gas slugs are injected into the composition during the gelation period and before the composition has formed a gel incapable of being penetrated by the gas at normal gas injection pressures. Normal gas injection pressures are injection pressures less than the formation fracturing pressure. The gas slugs foam the composition so that a foamed gel is produced.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected foamable, gel-forming composition). Preferably, the amount of gas injected is about 20 to about 98, and more preferably about 40 to about 95, volume percent based upon the total volume of injected treatment fluids.

The injected gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), nitrogen, and carbon dioxide. Air, nitrogen, and carbon dioxide are the more preferred noncondensable gases, with nitrogen being the most preferred.

The delayed gel degrading agents are transformed into their active species either during or after the gelation period. For example, the delayed pH modifying agents and gas precursors are transformed into their active species during or after the gelation period. When excess crosslinking agent is employed as the delayed gel degrading agent, the gel undergoes syneresis after the gel has been formed. The main purpose of the delayed gel degrading agent is to form pathways in the foamed gel, with some of the pathways connecting the bubbles present in the gel. These pathways preferentially favor or permit the flow of a nonaqueous fluid relative to the flow of an aqueous fluid through the foamed gel.

In general, the foamable, gel-forming compositions are formed by mixing in an aqueous media (such as water or brine) about 0.5 to about 50 weight percent polymer, about 0.0001 to about 1 weight percent crosslinking agent (when not employed as a delayed gel degrading agent), and a sufficient amount of one or more of the delayed gel degrading agents to partially degrade the resulting foamed gel. As known to those skilled in the art, the exact amounts of polymer and crosslinking agent (when the latter is not employed as a delayed gel degrading agent) are selected to assure (a) gel stability at reservoir (i.e., subterranean) conditions and (b) a suitable time frame for injecting the composition prior to gelation. To avoid prematurely foaming the composition, the surfactant is preferably added to the composition on the fly, i.e., as the composition is being injected into a subterranean formation.

One exemplary process for practicing the present invention is as follows. Before mixing any chemicals into the water employed in making the foamed gel-forming composition, the water is generally filtered to prevent suspended solids from damaging the formation by plugging the wellbore. Typically, the first chemicals added to the water are any required salts such as potassium or calcium chloride. Salts are generally employed to prevent clay problems in the formation and/or to help stabilize the gel. Next, gas precursor salts, if used, are added to the aqueous solution.

In order for the polymer to experience a high degree of turbulence during the initial mixing stage, solid polymers and liquid-based polymers are usually added to the water through an eductor or a positive displacement pump, respectively. The polymer and water are typically mixed in a mixing tank in small batches (about 10 to about 25 barrels per batch). When desired, further mixing is achieved using either centrifugal pumps or other forms of agitation.

Once the polymer is completely mixed into the water, the delayed pH modifying agent (when used), is added to the water-polymer containing mixing tank. Frequently, the last chemical to be added to the mixing tank is the crosslinking agent. When used in a solid form, the crosslinking agent is commonly first dissolved in water in order for it to more readily mix with the contents of the mixing tank. This is especially important when the contents of the mixing tank are very viscous.

The gel-forming composition is obtained when all the desired ingredients, except the surfactant, have been mixed in the mixing tank. The resulting gel-forming composition is then often injected into the subterranean formation through a production well at a pressure below the fracture pressure of the formation with the surfactant being added to the composition on the fly, i.e., as the composition is being injected into the subterranean formation. (Introducing the surfactant into the composition on the fly avoids foaming the composition in the mixing tank.) Depending on the injection capabilities of the well, the first slug of the foamable gel-forming composition generally varies from about 25 to about 100 barrels. Next, the injection of foamable gel-forming composition is stopped and a noncondensable gas such as nitrogen is injected into the production well to foam the gel-forming composition. The volume of the nitrogen slug (based upon the temperature and pressure conditions within the formation being treated) is typically about 100 to about 1,000 percent of the volume of the previously injected slug of foamable gel-forming composition volume. The alternating slugs of foamable gel-forming composition and nitrogen are then repeated to achieve the desired penetration depth into the formation as well as the desired degree of foam quality. (The resulting foamed gel usually has a foam quality of at least about 50 volume percent, preferably about 70 to about 99 volume percent, more preferably about 80 to about 99 volume percent, and most preferably about 90 to about 98 volume percent. As used in the specification and claims, the foam quality is the volume of gas bubbles present in the foamed gel divided by the entire volume of the foamed gel.) The volume of the final nitrogen slug is preferably large enough to over-displace the wellbore of any foamable, gel-forming composition.

The foamable, gel-forming composition is displaced into the formation a sufficient distance so that at least a portion of the pore space in the formation, typically at least about 3 feet from the production well or point of injection, is occupied by the composition. Preferably, the foamable, gel-forming composition occupies at least a portion of the pores located at least about 15 feet from the well. More preferably, at least some of the pores located at least about 30 feet from the production well contain the composition.

The well is then shut in for a sufficient period of time to allow the foamed, gel-forming composition within the pores of the subterranean formation to form a foamed gel. Following the shut in period, the well is slowly put back on production. However, if the foamed gel has reduced the formation permeability beyond an acceptable amount, the well is then commonly acidified to remove portions of the foamed gel.

The treatment process of the present invention is also applicable to treating subterranean formations having a plurality of zones of differing permeabilities. In one version for treating such a combination of subterranean zones, the zone of greatest permeability is selectively plugged by a three step process. In the first step, a temporary foamable or nonfoamable gel-forming composition containing a sufficient concentration of the delayed gel degrading agent to virtually remove the entire resulting gel is injected into the formation through the production well to block the pores of the less permeable zones. The second step comprises treating the zone of greatest permeability to form a more permanent selective plug, penetrating deeper into this more permeable zone, using the above described techniques for forming foamable gels. The temporary plug is then removed (e.g., by internal degradation), restoring flow to the less permeable zones while maintaining the deeper plug in the more permeable zone.

Another version for treating subterranean zones having differing permeabilities entails treating the various zones using the above described method of the present invention. Because the composition tends to enter into the zone of greatest permeability, the resulting foamed gel penetrates deeper into the greatest permeability zone and penetrates less deeply into the zones of lesser permeability. Accordingly, the thinner layer of foamed gel present in the zones of lesser permeability are removed, e.g., by acid or bleach treatment, and fluid flow is restored to these less permeable zones.

B. ENHANCED OIL RECOVERY APPLICATIONS

In accordance with the present invention, the flow of gas through a formation containing a plurality of zones having different gas permeabilities is redistributed by conforming or making more uniform the vertical gas permeability profile proximate the injection well. Because of the uniform vertical gas permeability profile, the gas injected as part of an enhanced oil recovery procedure tends to move across the formation to the production well in a more evenly distributed or piston-like fashion. Accordingly, the uniform distribution of the gas along the vertical profile of the formation enables the injected gas to contact, and therefore mobilize or recover, more of the oil present in the less permeable formation zones.

To illustrate this embodiment of the invention, prior to or at some time during a miscible flood, steam flood, fire flood, immiscible flood, or other gas injection enhanced oil recovery process, a foamed gel is formed by injecting (a) a foamable gel-forming composition and (b) a gas for foaming the composition into an injection well using the technique disclosed in above section A with respect to treating subterranean formations proximate a production well. The resulting foamed gel yields a selective permeable barrier favoring the flow of gas over the flow of aqueous liquids. Since the entire barrier possesses substantially the same gas permeability, the barrier conforms the vertical permeability profile within the treated portion of the formation. Accordingly, instead of the gas injected as part of the enhanced oil recovery process being transported primarily through the most gas-permeable zones of the formation, the gas-permeable barrier causes the enhanced oil recovery gas to more uniformly (a) distribute itself along the vertical length of the treated formation and (b) transverse the horizontal distance between the injection well and production wells.

The enhanced oil recovery techniques of the present invention are also usable in conjunction with water alternating gas (WAG) techniques wherein a water slug is employed to act as a barrier to a subsequently injected enhanced oil recovery gas slug in an attempt to redistribute the gas flow through a different formation zone. However, the present invention obviates employing the WAG technique because the gas-permeable barrier makes the less permanent and less gas-permeable water barrier redundant and, in comparison to the gas-permeable barrier used in the present invention, relatively inefficient.

EXAMPLES

The following Example 1 illustrates one version of the present invention for selectively reducing the flow of an aqueous fluid with respect to the flow of a nonaqueous fluid in a subterranean formation. Exemplary enhanced oil recovery embodiments within the scope of this invention are set forth in Examples 2 and 3. All of the examples are illustrative only and are not intended to limit the scope of the invention.

EXAMPLE 1

Exemplary Process For Selectively Reducing A Water/Hydrocarbon Production Ratio

Potassium bicarbonate (1,400 lbs) is mixed with 300 barrels (bbls) of freshwater and delivered to the well site. Prior to being delivered, the water is filtered through 20-micron size filters. On-site, the water is pumped into a 400 bbl storage tank. The resulting water is then pumped through a 5-micron size basket filter and through an eductor.

The eductor is used to mix hydroxypropyl guar polymer (available from Aqualon) with the water. The resulting mixture is introduced into an agitated mixing tank to which formaldehyde is also added. Table 1 below shows the amount of chemicals to be added for each batch of polymer solution that is mixed. After the first batch of polymer composition is mixed, it is transferred to a work tank from where it is injected into the formation to be treated. Ethyl formate is added to the composition during the last phase of the treatment. In addition, a 20 weight percent solution of TYZOR 131 brand crosslinking agent (available from DuPont) is mixed in a 100 gallon tank and added to the injection stream at the wellhead with a metering pump. Also, about 260 gallons of an alpha olefin surfactant solution (about 50 weight percent active) is also pulsed into the injected stream at the wellhead to give a final surfactant concentration in the injected foamable, gelable composition of about 1 weight percent.

After the first 100 barrels of the foamable gel-forming composition is injected into the formation, about 20,000 SCF of nitrogen is then injected into the formation as the alternating gas slug. The gas is designed to foam the injected composition. Another slug of about 15,000 SCF of nitrogen is injected following the second (about 80 bbl) slug of the foamable gel-forming composition. After the final foamable gel-forming composition slug (about 60 bbl), the gel-forming composition is further foamed and displaced from the wellbore and into the formation with about 35,000 SCF of nitrogen. The well is then shut in for about 5 days to allow the gel-forming composition to form a foamed gel. The injection schedule is also given in Table 1.

TABLE 1

| Batch No. | Volume (bbls) | DGDA[a] (lbs) | CA[b] (lbs) | Surf[c] (lbs) | Poly[d] (lbs) | HCHO (gals) | KHCO$_3$ (lbs) |
| --- | --- | --- | --- | --- | --- | --- | --- |
| 1 | 50 | 190 | 10.5 | 175 | 70 | 3.5 | 235 |
| 2 | 50 | 190 | 10.5 | 175 | 70 | 3.5 | 235 |
| 1st Composition Slug = 100 bbls; 1st N$_2$ Slug = 20 MSCF[e] | | | | | | | |
| 3 | 50 | 190 | 10.5 | 175 | 70 | 3.5 | 235 |
| 4 | 30 | 100 | 6.5 | 100 | 70 | 3.5 | 140 |
| 2nd Composition Slug = 80 bbls; 2nd N$_2$ Slug = 15 MSCF | | | | | | | |
| 5 | 50 | 190 | 10.5 | 175 | 70 | 3.5 | 235 |
| 6 | 10 | 40 | 2.0 | 35 | 70 | 3.5 | 50 |
| 3rd Composition Slug = 60 bbls; 3rd N$_2$ Slug = 35 MSCF | | | | | | | |
| Total | 240 | 900 | 50.5 | 835 | 420 | 21.0 | 1130 |

[a]DGDA denotes ethyl formate delayed gel degrading agent.
[b]CA denote TYZOR 131 brand crosslinking agent.
[c]Surf denotes an alpha olefin sulfonate surfactant.
[d]Poly denotes hydroxypropyl guar polymer.
[e]MSCF denotes thousand standard cubic feet.

EXAMPLE 2

Carbon Dioxide Flood

An oil reservoir, consisting of a carbonate formation having four major producing zones separated by impermeable anhydrite layers, contains a light oil having an API gravity of about 35°. Waterflooding is initially used to recover a portion of the original oil in place and a carbon dioxide flood is used to mobilize the remaining oil. Incremental oil recovery is expected to be achieved using the carbon dioxide flood. To recover a substantial amount of oil using the carbon dioxide flood, the injected carbon dioxide must contact most of the reservoir.

Carbon dioxide injection surveys show that most of the carbon dioxide enters zones 1, 2, and 4 with very little entering zone 3. To force carbon dioxide into zone 3, a gel pretreatment is designed. The gel is formulated to decrease water permeability in zones 1, 2 and 4 but to allow gas permeability into these same zones. The overall objective of the gel treatment is to force a greater percentage of the carbon dioxide into zone 3.

The treatment consists of three slugs of foamable gel-forming composition alternated with three slugs of nitrogen. The foamable gel-forming composition contains about 4,000 ppm of Allied Colloids 935 brand low hydrolysis, polyacrylamide polymer, about 600 ppm of potassium dichromate, about 1,800 ppm of sodium thiosulfate, about 10,000 ppm of a delayed gel degrading agent all mixed in field brine produced from the reservoir, and about 15,000 ppm of an Alipal CD125 brand surfactant (the surfactant being added to the composition on the fly). Each of the foamable gel-forming composition slug sizes are about 200 barrels in volume and are sequentially followed with a gas slug of about 300 barrels, measured at reservoir temperature and pressure. Following the third and final gas slug, the well is shut in for about three days to allow the foamed gel to form and the delayed gel degrading agent to form pathways in the foamed gel—making the gel gas-permeable.

When a second survey is taken, the proportion of carbon dioxide entering zone 3 is expected to increase. After taking the second survey, carbon dioxide injection is resumed and, at six month intervals, gas entry surveys are rerun to ensure that the vertical distribution of carbon dioxide gas remains uniform. Due to the expected more uniform distribution of carbon dioxide through the oil containing zones of the reservoir, the amount of oil recoverable from the reservoir using the carbon dioxide flood is also expected to increase.

EXAMPLE 3

Steam Flooding

A California steam flood is in operation to recover a viscous 12° API crude. Surveys of the injected steam show a severe override of the steam near the top of the reservoir. Injection of a foamable gel-forming composition to redirect the steam into the lower part of the reservoir is expected to improve the oil recovery by contacting more of the reservoir with heat. In addition, steam breakthrough at the producing wells located about 50 feet away is expected to be delayed due to the improved distribution of the injected steam.

The well is cooled down to about 250° F. by injecting water. About 200 barrels of a foamable, gel-forming composition containing about 2.5 weight percent of American Cyanamid Cyanagel 100 brand partially hydrolyzed, low molecular weight polyacrylamide polymer, about 0.25 weight percent of potassium dichromate, about 1 weight percent thiourea, 1 weight percent potassium bicarbonate, 0.5 weight percent ethyl butyrate, and about 2.5 weight percent linear alkyl toluene sulfonate surfactant having an alkyl group containing about 15 carbon atoms are injected into the formation with the surfactant being added to the composition on the fly. The fluids in the wellbore are displaced with nitrogen. The pathway-containing foamed gel is allowed to form for about two days.

Steam injection is then resumed for about seven days before a gas survey is run again. The new survey is expected to show that a substantial proportion of the steam is being redirected to lower zones.

The presence in a porous media (such as a subterranean formation) of the pathway-containing foamed gels of the present invention reduces the aqueous fluid (e.g., water) flow rate through the porous media with respect to the flow rate of a nonaqueous fluid (e.g., natural gas, nitrogen, oil). Accordingly, in a subterranean formation containing both aqueous and nonaqueous fluids, the presence of the pathway-containing foamed gel enhances the flow rate of the nonaqueous fluid relative to the flow rate of the aqueous fluid.

Although the present invention has been described in considerable detail with reference to some preferred versions, other versions are possible. For example, in addition to treating subterranean formations containing natural resources to selectively reduce the flow of an aqueous fluid with respect to that of a nonaqueous fluid, the methods of the invention are also applicable for remedially treating man-made formations, such as toxic landfills, to selectively reduce the flow of water or other aqueous fluids with respect to nonaqueous contaminants emanating from the toxic landfill. By reducing the effluent from the landfill to primarily the nonaqueous contaminants, a cost savings is potentially achievable because it is then necessary to collect and treat smaller fluid volumes. In addition, the present invention is suitable for use in treating both fractured and unfractured formations. Furthermore, besides being used to conform the vertical gas permeation profile to improve the distribution and migration of gases in the more conventional enhanced oil recovery techniques discussed above, the present invention can be used to conform the vertical gas permeability profile to improve organic vapor enhanced oil recovery techniques. Therefore, the spirit and scope of the appended claims should not necessarily be limited to the description of the preferred versions contained herein.

What is claimed is:

1. A method for selectively reducing the flow of an aqueous fluid with respect to the flow of a nonaqueous fluid in a subterranean formation, the method comprising, in any order, the steps of:
   (a) injecting into at least a portion of a subterranean formation a composition comprising (i) one or more ingredients capable of reacting to form a gel and (ii) a delayed gel degrading agent;
   (b) injecting into at least a portion of the subterranean formation one or more surfactants capable of foaming the composition; and
   (c) injecting a gas for foaming the composition into at least a portion of the subterranean formation.

2. The method of claim 1 wherein, the composition, gas, and one or more surfactants interact to form a foamed gel and at least a portion of the delayed gel degrading agent forms an active material that creates pathways in the foamed gel.

3. The method of claim 1 wherein the delayed gel degrading agent comprises a delayed pH modifying agent.

4. The method of claim 1 wherein the delayed gel degrading agent comprises an acid precursor.

5. The method of claim 1 wherein the delayed gel degrading agent comprises a base precursor.

6. The method of claim 1 wherein the delayed gel degrading agent comprises a crosslinking agent, the crosslinking agent being present in a sufficient concentration for the foamed gel to undergo syneresis.

7. The method of claim 1 wherein the delayed gel degrading agent comprises a gas precursor.

8. The method of claim 1 wherein the delayed gel degrading agent comprises a combination of a gas precursor and a delayed pH modifying agent.

9. The method of claim 1 further comprising the steps of:
   (d) substantially reducing fluid permeability in at least one of the less permeable zones of the formation prior to performing steps (a)–(c); and
   (e) after performing steps (a)–(c), restoring fluid permeability in at least one of the zones wherein the fluid permeability was substantially reduced in step (d).

10. The method of claim 1 wherein step (a) includes the step of injecting the composition through a production well into at least a portion of the subterranean formation, step (b) includes the step of injecting the one or more surfactants through the production well into at least a portion of the subterranean formation, and step (c) includes the step of injecting the gas through the production well into at least a portion of the subterranean formation.

11. The method of claim 1 wherein the nonaqueous fluid is selected from the group consisting of liquid hydrocarbons, gaseous hydrocarbons, and gaseous nonhydrocarbons.

12. The method of claim 1 wherein at least a portion of step (b) is conducted during at least a portion of step (a).

13. The method of claim 1 wherein at least a portion of step (c) is conducted during at least a portion of step (a).

14. The method of claim 1 wherein at least a portion of steps (b) and (c) are conducted during at least a portion of step (a).

15. The method of claim 1 wherein step (c) is repeated a plurality of times during at least a portion of step (a).

16. The method of claim 1 wherein steps (a) and (c) are sequentially repeated a plurality of times.

17. The method of claim 1 wherein the gas is a noncondensable gas.

18. A recovery system comprising:
(a) a subterranean formation;
(b) a well penetrating at least a portion of the subterranean formation; and
(c) a foamed gel having pathways therein, the gel being located in at least a portion of the subterranean formation and being formed by the method of claim 1.

19. A recovery system comprising:
(a) a subterranean formation;
(b) a well penetrating at least a portion of the subterranean formation; and
(c) a foamed gel located in at least a portion of the subterranean formation, at least a portion of the gel having pathways therein and a noncondensable gas being present in at least a portion of the passageways in a sufficient concentration for gas to flow.

20. A recovery system comprising:
(a) a subterranean formation;
(b) a well penetrating at least a portion of the subterranean formation; and
(c) a composition containing (i) one or more ingredients capable of reacting to form a gel, (ii) a surfactant, and (iii) a delayed gel degrading agent located in at least a portion of the well, the concentration of the delayed gel degrading agent in the composition being sufficient to cause syneresis but less than the concentration required to virtually degrade the entire gel.

21. An enhanced oil recovery process comprising the steps of:
(a) injecting a first gas into at least a portion of a subterranean formation having a plurality of vertical zones of different gas permeabilities;
(b) injecting a composition into a subterranean formation through an injection well, (i) the composition comprising (A) one or more ingredients capable of reacting to form a gel, (B) a surfactant, and (C) a delayed gel degrading agent, and being foamed by the first gas to form a foamed gel along at least a portion of the vertical length of a plurality of the different gas permeability zones, (ii) the delay gel degrading agent forming pathways in the gel, and (iii) the pathway-containing gel being capable of selectively reducing the flow of an aqueous fluid with respect to the flow of a nonaqueous fluid; and
(c) subjecting the formation to an enhanced oil recovery process by injecting a fluid into the subterranean formation through the injection well, wherein at least a portion of the injected fluid is a second gas that transverses the pathway-containing foamed gel and enters a plurality of zones of different gas permeability.

22. A method for selectively reducing the flow of an aqueous fluid with respect to the flow of a nonaqueous fluid in a subterranean formation, the method comprising the steps of:
(a) injecting into at least a portion of a subterranean formation a composition comprising (i) one or more ingredients capable of reacting to form a gel, (ii) a delayed gel degrading agent, and (iii) one or more ingredients capable of foaming the composition; and
(b) injecting a gas into at least a portion of the subterranean formation.

23. The method of claim 22 further comprising the step (c) of allowing the composition and the gas to interact to form a pathway-containing foamed gel.

24. The method of claim 22 further comprising the step (c) of allowing the composition and the gas to interact to form a foamed gel, wherein the concentration of the delayed gel degrading agent in the composition is less than the concentration required to degrade the entire foamed gel.

25. A method for selectively reducing the flow of an aqueous fluid with respect to the flow of a nonaqueous fluid in a subterranean formation, the method comprising, in any order, the steps of:
(a) injecting into at least a portion of a well penetrating at least a portion of a subterranean formation a composition comprising (i) one or more ingredients capable of reacting to form a gel and (ii) a delayed gel degrading agent;
(b) injecting into at least a portion of the well one or more surfactants; and
(c) injecting a gas for forming a foamed gel into at least a portion of the well.

* * * * *